UNITED STATES PATENT OFFICE.

ABRAHAM WIJNBERG, OF AMSTERDAM, NETHERLANDS.

PROCESS FOR THE REGENERATING OF DECOLORIZING-CARBON.

1,074,337. Specification of Letters Patent. Patented Sept. 30, 1913.

No Drawing. Application filed August 29, 1912. Serial No. 717,777.

*To all whom it may concern:*

Be it known that I, ABRAHAM WIJNBERG, diplomated technologue, teacher at the School for Sugar Industry in Amsterdam, a subject of the Queen of the Netherlands, and residing at 567, Heerengracht, Amsterdam, Netherlands, have invented certain new and useful Improvements in Processes for the Regenerating of Decolorizing-Carbons, of which the following is a specification.

The object of the present invention consists in a new process for regenerating decolorizing carbon and to produce as a new manufacture a regenerated decolorizing carbon.

By the term "decolorizing carbon" in the technology of chemistry a special type or sort of carbon is designated and is to be understood, which is characterized by the large percentage of pure carbon contained in the same and further by the fact, that the same contains a minimum or at least very little soluble bodies. The so-called "decolorizing carbons" represent a special type of carbons, which are distinguished from all other carbons of any kind by their great decolorizing capacity, due to the special method, in which they are manufactured or produced. It may be understood, that by the term "decolorizing carbons" in the technology of chemistry no ordinary charcoal (wood coal) will be understood, which is obtained either in charcoal piles or by the dry distillation process, nor will by this term bone black be designated.

Decolorizing carbons, the regenerating of which is forming the object of the present invention, is a product already in general use and sale and is a known industrial product or manufacture (see *The Oil and Colour Trades Journal*, 1912 pages 1380 and 1429). The same are produced in different ways, f. i. by subjecting organic substances to be carbonized—resp. to be transformed—or being already converted into carbon, to the treatment by means of hot or heated gases, as f. i. ammonia, overheated steam, chlorin and the like, whereby the carbon is subjected to a certain chemical transformation.

The present application now has for its object to treat this special kind of decolorizing carbon (obtained either according to the process thus described, or by any other suitable process or method) for the purpose of regenerating same, f. i. for rendering the carbon suitable for repeated and renewed decolorizing use. This class of decolorizing carbons are hitherto used for decolorizing glycerin, acetates, sugar of milk, lactic acids, greases, oils, waxes, paraffin and other suitable substances and bodies.

It is a known fact and characteristic for the decolorizing carbons, that the same, once having been subjected to any decolorizing action, will be saturated with coloring matters or other impurities to such an extent as to become unsuitable for further use and that they are becoming a waste product, which must be thrown away. In order to avoid the heavy loss, supported by the respective industries, by the fact, that this expensive material is becoming unsuitable for repeated use and by its becoming a waste product, it has been tried to regenerate or revivify same by subjecting the decolorizing carbon to a glow-process. The powder form, in which these decolorizing carbons nearly exclusively are brought on the market, is a bar against the use of the glowing process as method for regenerating, as it has been found, that by glowing, the powdered decolorizing carbon cannot be regenerated in a thorough or suitable or economical manner. According to the present invention, the regeneration of the decolorizing carbons of the type described, will be attained by subjecting them to the treatment with alkaline solutions, (as f. i. solutions of carbonic or caustic alkalies or lime) in warm state or by boiling same.

As a result of a series of scientific tests, applicant established the fact, that the regenerating capacity of the alkaline solution is rising with the growing alkalinity of same.

The decolorizing carbon, after having been used for decolorizing purposes and after having once exercised its decolorizing effect, will contain bodies, previously subjected to the decolorizing action and which remained in the carbon as f. i. glycerin, acetates, etc. These bodies will have to be washed out, by subjecting the carbon to a suitable washing or extracting process. The decolorizing carbon thus freed, is then for the purpose of regeneration treated with alkaline solution, resp. boiled. The mass will hereafter be filtered or allowed to settle in order to remove the alkaline solution and to separate same from the decolorizing carbon, and is then washed out. The last traces of alkaline, which may have remained in the decolorizing carbon, can be neutralized by acids.

By this invention is attained, that the decolorizing carbon may be submitted to a repeated use. As a result of this, an unlimited number of industries, which were prevented from using decolorizing carbon on account of the heavy costs of same and on account of the fact, that this expensive material could not repeatedly be used, will be enabled to employ decolorizing carbon, attaining thereby a more thorough and better decolorizing effect and economical result.

Claims:

1. A process for regenerating decolorizing-carbon containing more than 50 per cent. of pure carbon and having a decolorizing power higher than bone-black, comprising treating said decolorizing-carbon with relatively strong alkaline solutions.

2. A process for regenerating decolorizing-carbon containing more than 50 per cent. of pure carbon and having a decolorizing power higher than bone-black, and containing absorbed impurities, comprising treating said decolorizing-carbon with alkaline solutions of such strength as to dissolve or destroy said absorbed impurities.

3. A process for regenerating decolorizing-carbon containing more than 50 per cent. of pure carbon and having a decolorizing power higher than bone-black, comprising treating said decolorizing-carbon with alkaline solutions having a minimum concentration of one per cent.

In testimony whereof I affix my signature in the presence of two witnesses.

ABRAHAM WIJNBERG.

Witnesses:
T. W. HULSHOFF,
WILLICUM ATARLY.